March 24, 1936.
E. E. HEWITT
2,035,068
FLUID PRESSURE BRAKE
Filed Oct. 10, 1934
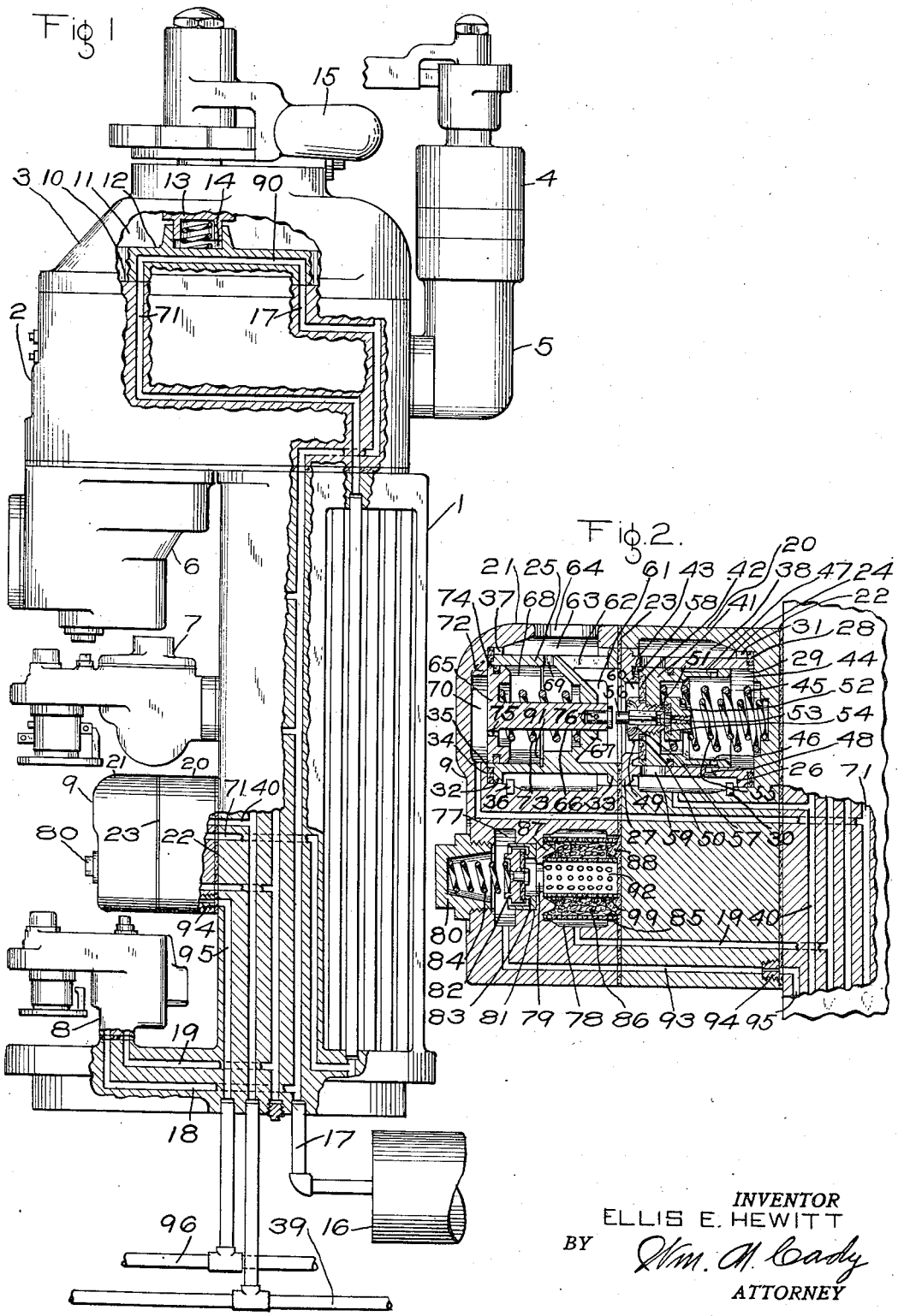
INVENTOR
ELLIS E. HEWITT
BY *Wm. A. Cady*
ATTORNEY Patented Mar. 24, 1936

2,035,068

UNITED STATES PATENT OFFICE 2,035,068

FLUID PRESSURE BRAKE

Ellis E. Hewitt, Edgewood, Pa., assignor to The Westinghouse Air Brake Company, Wilmerding, Pa., a corporation of Pennsylvania Application October 10, 1934, Serial No. 747,731

13 Claims. (Cl. 303—81)

This invention relates to fluid pressure brakes and more particularly to brake controlling apparatus adapted to be carried on the locomotive of a train.

In the patent of Clyde C. Farmer, No. 1,975,264, there is disclosed a brake equipment for use on locomotives which includes a brake valve device and a vent valve device that is operated by fluid under pressure supplied through the brake valve device upon movement thereof to emergency position to initiate a sudden emergency reduction in brake pipe pressure at the locomotive of a train. According to this construction the brake valve device is of the pedestal type adapted to be mounted on the floor of a locomotive cab, while the vent valve device is separate from the brake valve device and connected thereto with a pipe.

In passenger trains there is a signal pipe which extends from car to car throughout a train parallel to the usual brake pipe. This signal pipe is adapted to be charged with fluid under pressure from the usual reducing valve device on the locomotive and by means of relief valves on the cars of the train slight reductions in pressure may be locally effected in the signal pipe at the cars, such reductions traveling through the signal pipe to a signal valve on the locomotive which responds according to the local reductions effected by the trainman to indicate to the engineer the desires of the trainman.

The usual well known locomotive equipment includes in addition to the apparatus above mentioned, a connection including a spring pressed check valve and a strainer between the pipe to which fluid under pressure is supplied by the usual reducing valve device and a pipe which is adapted to be connected to the signal pipe of a passenger train, the strainer being provided to prevent foreign matter from passing into the signal pipe, while the check valve is provided to prevent an undesired reduction in signal pipe pressure to occur in case the pressure in the pipe charged by the reducing valve device is reduced below signal pipe pressure when the usual independent brake valve device is operated to permit flow of fluid under pressure from said pipe for effecting an independent application of the locomotive brakes.

One object of the invention is to provide an improved pedestal type brake valve structure including in a detachable portion a brake pipe vent valve structure and signal pipe spring pressed check valve and strainer.

By this improved construction a number of pipes and pipe connections, with the attendant possibility of breakage and leakage, are eliminated, the improved construction facilitates inspection, cleaning and repairs of the structure, and furthermore, reduces the number of units making up a locomotive equipment and thereby facilitates handling and installation of the apparatus.

The usual brake pipe vent valve, such as disclosed in the aforementioned pending application, is normally pressed to its seat by brake pipe pressure, and in order to unseat said vent valve, either a relatively large volume of fluid at low pressure with a relatively large area piston or a build up of fluid pressure to a relatively high degree on a smaller area piston is employed. In either case the interval of time which elapses between the movement of the brake valve and the unseating of the vent valve is greater than desirable, and another object of the invention is to provide an improved brake pipe vent valve device which will operate to vent fluid under pressure from the brake pipe more promptly after movement of the brake valve handle to emergency position than has been possible with vent valve devices heretofore employed.

The last mentioned object is attained by providing in addition to the brake pipe vent valve a relatively small valve which is operative by the vent valve actuating piston, before the vent valve is operatively engaged thereby, to reduce the pressure acting to seat the vent valve to a low degree, so that a small increase in actuating pressure will operate said piston to unseat the vent valve and thereby initiate an emergency reduction in brake pipe pressure. Since this small increase in pressure on the vent valve piston will be obtained in a shorter period of time after movement of the brake valve to emergency position than a greater increase as required to unseat the usual vent valve, it will be evident that an emergency reduction in brake pipe pressure will be initiated more promptly with a device constructed in accordance with the invention than with prior vent valve devices.

In the accompanying drawing; Fig. 1 is an elevational view of a pedestal type of brake valve device embodying the invention and with certain portions broken away in order to more clearly show internal construction; and Fig. 2 is an enlarged sectional view of a portion of the device shown in Fig. 1.

As shown in the drawing, the brake valve device comprises a pedestal 1 adapted to be mounted on the floor of a locomotive cab or the like, an automatic brake valve body 2 mounted on the pedestal 1, a cover 3 mounted on the body 2, an independent brake valve device 4 carried by a bracket 5 which is mounted on the body 2, mechanism 6 carried by the lower face of the brake valve body and operative to control a service reduction in brake pipe pressure, a feed valve device 7 and a reducing valve device 8 both of which are mounted on the pedestal 1, and a brake pipe vent valve device and signal pipe charging means 9 is also mounted on the pedestal 1.

The invention resides in the construction of and association with the brake valve pedestal 1 of the vent valve device and signal pipe charging means 9, and only as much of the construction and operation of the other devices above enumerated as is required to a complete understanding of the invention will be hereinafter provided.

The automatic brake valve body 2 is provided with a rotary valve seat 10, and the cover 3 has a chamber 11 into which said valve seat opens. A rotary valve 12 is contained in the chamber 11 and is mounted to rotate on the seat 10. The usual rotary valve operating stem 13 is journaled in the cover 3 and has one end which extends into a slot 14 provided in the rotary valve 12 for obtaining a driving connection therewith, while a handle 15 is provided on the outer end of said stem for turning said stem and thereby said rotary valve to various brake controlling positions.

The reducing valve 8 may be of any desired construction adapted to supply fluid at a constant reduced pressure. As shown in Fig. 1, the reducing valve device 8 is supplied with fluid under pressure from a main reservoir 16 which is connected to said reducing valve device through a pipe 17 and a passage 18 in the pedestal 1, which passage leads to said reducing valve device as well as to the rotary valve seat 10. The reducing valve device thus receives fluid at main reservoir pressure through passage 18 and is adapted to reduce this pressure to that desired for independent operation of the locomotive brakes and supply fluid at such reduced pressure to a passage 19.

The vent valve device and signal pipe charging means 9 is mounted on the pedestal 1 in a space provided between the feed valve device 7 and reducing valve device 8 and comprises two casing sections 20 and 21. The casing section 20 is mounted directly upon the pedestal 1 with a gasket 22 interposed between said casing section and pedestal, while the casing section 21 is mounted on the casing section 20 with a gasket 23 interposed between the two casing sections.

The casing section 20 is provided with a chamber which is open only at the end facing the casing section 21 and which contains a bushing 24, while the casing section 21 is provided with an oppositely disposed axially arranged chamber which contains a bushing 25.

The bushing 24 is provided on the inner end with a collar 26 and on the outer end with a collar 27 while the casing section is provided with bores adapted to freely receive said collars for guiding the bushing into place. The bushing at the inner end seals against a gasket 28 and at the outer end against one face of gasket 23. A lip 29 on the inner end of the bushing is provided to engage the casing so as to define the position of said bushing within the casing section 20, but the length of said lip is sufficiently less than the normal thickness of gasket 28 as to ensure sufficient displacement of said gasket to provide a leakproof seal around the inner end of said bushing. A pin 30 is disposed in the casing outside of collar 26 and is adapted to engage said collar to normally hold the bushing 24 within the casing, while a slot 31 is provided through said collar, through which slot the pin 30 is adapted to pass in applying and removing the bushing to and from the casing.

The bushing 25 is similar to bushing 24 in so far as being provided with an inner collar 32 and an outer collar 33 for centering the bushing in the casing section 21 between a gasket 34 and the other side of gasket 23, and is also provided with a lip 35 on the inner end for defining the position of the bushing in the casing, and the casing is provided with a pin 36 adapted to engage the collar 32 for holding the bushing in the casing section, while a slot 37 through collar 32 is provided to permit passage of pin 36 in applying and removing the bushing 25 to and from the casing section 21.

An annular chamber 38 is formed in the casing section 20 around the bushing 24 and is in constant communication with the usual brake pipe 39 through a passage 40. The bushing 20 is provided with an axial bore in which a brake pipe vent valve 41 is mounted to slide. A gasket 42 is carried on the head of said vent valve and is adapted to engage a seat rib 43 provided in the outer end of the bushing. A chamber 44 is provided at the other side of the vent valve 41 and contains a spring 45 which acts on said vent valve for urging said vent valve to the position in which the gasket 42 seals against the seat rib 43. The chamber 44 is in constant communication with brake pipe 39 through a plurality of passages 46 provided through the skirt of the vent valve 41, an annular chamber 47 formed between said skirt and the bore in bushing 24, a restricted port 48 through the side wall of said bushing and from thence through chamber 38 and passage 40.

An axial bore is provided through the head of the vent valve 41 and secured in said bore by screw-threaded engagement is a member 49 having a shoulder 50 engaging gasket 42 holding said gasket in place.

The member 49 extends through the head of the vent valve 41 and is provided with a through axial bore, a seat rib 51 being formed on said member around said bore within the chamber 44. A relief valve 52 having a fluted stem 53 disposed to slide in the bore in member 49, is provided with a gasket 54 adapted to engage and seal against the seat rib 51. A spring 55 disposed within spring 45 acts on said relief valve for urging said valve to the position in which gasket 54 seals against seat rib 51.

The flutes on the relief valve stem 53 terminate short of the outer face of member 49 into an operating pin 56 which projects beyond said outer face. A slot 57 is cut diametrically across the outer face of member 49 for reasons which will hereinafter be described.

With the gasket 42 of the vent valve 41 engaging seat rib 43, a chamber 58 is formed outside of said seat rib which is in constant communication with the brake pipe chamber 38 through a plurality of large ports 59 provided through the side wall of bushing 24, while a chamber 60 is formed within said seat rib and is in communication with the atmosphere through a chamber 61 and passage 62 in bushing 25, and a chamber 63 and large atmospheric opening 64 in the casing section 21.

The bushing 25 is provided with an axial bore containing a vent valve actuating piston 65 which is provided with a stem 66 disposed to slide in a suitable bore provided through a partition wall 67 which separates a chamber 68 at one side of said piston from the atmospheric chamber 61, the chamber 68 being in constant communication with the atmosphere through a passage 69 in the side wall of bushing 25 and from thence through chamber 63 and the large atmospheric opening 64.

The piston 65 has at the opposite side a chamber 70 which is connected to a passage 71 that leads to the seat of the rotary valve 12. A stop lug 72 is provided on the casing in chamber 70 adapted to limit movement of the piston 65 in a direction toward the left hand, while a spring 73 contained in chamber 68 and surrounding the piston stem 66 is interposed between the partition wall 67 and said piston for urging said piston into engagement with the stop lug 72.

The piston 65 is provided with a packing ring 74 for preventing leakage past the piston and also is provided with a small relief or bleed port 75 establishing a restricted communication from chamber 70 to chamber 68.

A wear insert 76 is provided in the end of the piston stem 66 within chamber 61 and is adapted to engage the relief valve operating pin 56, the diameter of said insert where it engages said pin being less than the length of the slot 57 in the end of member 49 carried by the vent valve piston 41.

To assemble the vent valve device in the casing sections 20 and 21, the relief valve 52 is applied to the vent valve piston 41 which is then mounted in the bushing 24. The gasket 28 is placed in the bottom of the chamber in the casing section 20 and with the springs 45 and 55 properly disposed within the bushing 24, the bushing 24 is inserted into said chamber in such a manner that the pin 30 will pass through the slot 31. After the pin 30 has passed through the slot, then the bushing is turned to a position in which the slot 31 is out of alignment with the pin 30 and said pin will engage collar 26 and thereby prevent the bushing 24 from falling out of the casing. The bushing 25 is applied to the casing section 21, in the same manner as just described in connection with bushing 24, after the vent valve piston 65 and spring 73 are assembled in the bushing 25, and then with the gasket 23 properly disposed the two casing sections 20 and 21 are secured together. Disassembling of the vent valve device is effected in the reverse order of assembling as will be evident.

The operation of the vent valve device is as follows: When the brake pipe 39 is charged with fluid under pressure in the usual manner, fluid from the brake pipe flows through passage 40 to chamber 38 and from thence through the passages 59 to the left hand face of the vent valve 41 and acts thereon over the area of said valve outside of the seat rib 43. Fluid under pressure also flows from chamber 38 through the restricted port 48, chamber 47 and ports 46 to chamber 44 at the spring side of the vent valve 41, and this fluid pressure in chamber 44 acting on the vent valve in addition to the pressure of springs 45 and 55 holds said vent valve seated against the opposing pressure of fluid acting on the opposite side outside of seat rib 43.

With the brake pipe 39 charged as just described, if it is desired to effect an emergency reduction in brake pipe pressure, the brake valve handle 15 and thereby the rotary valve 12 are turned to the emergency position in which position said parts are shown in Fig. 1 of the drawing. In this position, a port 90 in the rotary valve establishes a communication from passage 17 to passage 71 so that fluid under pressure is supplied from main reservoir 16 to chamber 70 at the outer face of the vent valve actuating piston 65.

The pressure of fluid thus supplied to the piston chamber 70 acts on piston 65 and first moves said piston and the stem 66 toward the right hand until said stem engages the relief valve operating pin 56. Then when sufficient pressure is obtained in chamber 70 acting on piston 65 to overcome brake pipe pressure plus the pressure of spring 55 acting to hold the relief valve 52 seated, the piston 65 is operated to move the piston stem 66 into engagement with the end of the member 49 carried by the vent valve 41. This fully unseats the relief valve 52 which permits fluid under pressure to flow from chamber 44 past the relief valve 52 to chamber 60 and from thence to the atmosphere through chamber 61, passage 62, chamber 63 and atmospheric passage 64.

The rate at which fluid under pressure is vented from chamber 44 past the unseated relief valve 52 exceeds that at which fluid under pressure flows into said chamber from the brake pipe by way of the restricted passage 48 to such an extent that the fluid pressure in chamber 44 becomes so reduced that the pressure of said fluid plus that of spring 45 on the right hand side of the vent valve 41 just slightly exceeds the pressure exerted by fluid from the brake pipe on the area of the left hand face of said valve piston outside of the seat rib 43.

With the vent valve 41 thus pressed against the seat rib 43 with a small differential of pressures, a slight increase in pressure in chamber 70 on piston 65 over that required to unseat the relief valve 52 acts to start moving the vent valve 41 away from the seat rib 43. Just as soon as the seal between gasket 42 and seat rib 43 is thus broken, fluid under pressure commences to flow from chamber 58 and thereby brake pipe 39 past the vent valve to chamber 60 which is open to the atmosphere, and this provides a slight increase in pressure in chamber 60 over the area of said vent valve within the seat rib 43 which increases the differential of pressures acting to move said vent valve piston toward the right hand, whereupon said vent valve 41 is moved to its wide open position as defined by engagement of the right hand side of the piston 65 with a shoulder 91 formed in bushing 25.

With the vent valve 41 wide open, fluid under pressure is rapidly vented from the brake pipe 39 through passage 40, chamber 38, ports 59 in the bushing 24, past said vent valve to chamber 60 and from thence through chamber 61, passage 62, chamber 63 and to the atmosphere through the atmospheric passage 64, thereby initiating an emergency reduction in brake pipe pressure.

It will be noted that since the differential of pressures acting to seat the vent valve 41 is reduced to a very low or substantially negligible degree by the operation of the relief valve 52, the amount of increase in pressure on piston 65 required to unseat said vent valve is much lower than required in the usual construction where no relief valve is employed, and since in a practical design of brake valve device the size of ports and passages, such as 17, 71, and 90, is limited, it will be evident that by employing a relief valve such as 52, an emergency reduction in brake pipe pressure may be initiated quicker than with the conventional construction, and this quicker initiation of emergency is very desirable from the standpoint of safety in connection with controlling trains.

In addition to the vent valve mechanism which is constructed and operates in the manner above described, the casing section 21 includes the signal pipe charging means hereinbefore mentioned and as will now be described.

The casing section 21 is provided with two oppositely disposed open ended chambers 77 and 78 which are connected by a passage 79, the open end of chamber 77 being closed by a cap nut 80 having screw-threaded engagement with the casing section, while the open end of chamber 78 is closed by the casing section 20.

A member 81 is pressed into the casing section 21 and has a chamber open to chamber 77 and containing a check valve 82 adapted to engage a seat rib 83 provided on said member around an opening leading to passage 79. A spring 84 is interposed between the cap nut 80 and check valve 82 for urging said check valve into engagement with seat rib 83.

An air strainer is disposed in chamber 78 and preferably comprises two concentrically arranged perforated cylinders 99 and 85 between which is packed curled hair 86. A circular rib 87 is provided on the bottom wall of chamber 78 concentric with passage 79, while a similar rib 88 is provided on gasket 23, said ribs being disposed in the space between the ends of the cylinders 99 and 85 for positioning said cylinders and for packing the curled hair at the ends of the space between said cylinders.

The chamber 78 is connected to passage 19 which is adapted to be supplied with fluid under pressure from the reducing valve device 8, and in operation, fluid under pressure supplied to passage 19 is adapted to flow through chamber 78, the strainer device including the perforated cylinders 85 and 99 and the curled hair 86 to a chamber 92 within the cylinder 99, from chamber 92 through passage 79, past the check valve 82 to chamber 77, then through passage 93 which includes a choke fitting 94 to passage 95 in the pedestal 1 and from thence to pipe 96 which is adapted to be connected to the signal pipe of a train, and through the communication just traced, the signal pipe of a train is adapted to be charged to substantially the pressure supplied by the reducing valve device 8, in the usual manner.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a vent valve device operative to effect a sudden reduction in brake pipe pressure, said vent valve device comprising a casing which is in two portions, a valve carrying member mounted in one portion of said casing and adapted to be applied to and removed from said portion of the casing by hand, a vent valve operatively mounted in said member, a piston carrying member mounted in the other portion of said casing and adapted to be applied to and removed from said other portion of the casing by hand, a piston operatively mounted in the piston carrying member for controlling the operation of said vent valve, the valve carrying member and piston carrying member cooperating with each other and said casing for rendering said vent valve device effective when the two portions of the casing are secured together.

2. In a fluid pressure brake, the combination with a brake pipe and a vent valve device operative to effect a sudden reduction in brake pipe pressure, said vent valve device comprising a casing having a chamber in communication with said brake pipe, a valve bushing mounted in said chamber and having passageways through which fluid under pressure is adapted to be vented from said chamber and thereby said brake pipe, a vent valve disposed in said bushing adapted to close communication through said passageways, a piston bushing mounted in another chamber in said casing, and a piston disposed in said piston bushing in operative alignment with said vent valve and operative by fluid under pressure to unseat said vent valve to vent fluid under pressure from said brake pipe, each of said bushings having a loose lateral fit in said casing so as to be readily installed in or removed from said casing by hand, a gasket interposed between the adjacent ends of said bushing, and a gasket interposed between the outer end of each of said bushings and the casing, said gaskets being displaced to prevent leakage of fluid under pressure past the ends of said bushings.

3. In a fluid pressure brake, the combination with a brake pipe and a vent valve device operative to effect a sudden reduction in brake pipe pressure, said vent valve device comprising a casing divided into a valve section and a piston section adapted to be secured together, said valve section having a chamber in communication with said brake pipe, a valve bushing mounted in said chamber and having passageways through which fluid under pressure is adapted to be vented from said chamber and thereby said brake pipe, a vent valve disposed in said bushing adapted to close venting communication through said passageways, a piston bushing mounted in the piston section of the casing, a piston mounted in said piston bushing and operative to unseat said vent valve and thereby open the venting communication through said passageways, said valve and piston bushings having a loose lateral fit in their respective casing sections so as to be installed and removed by hand, means acting to normally hold said valve bushing and thereby said vent valve assembled in the valve section of the casing, said means being ineffective upon turning said valve bushing, means acting to normally hold said piston bushing and thereby said piston assembled in the piston section of the casing and being ineffective upon turning said piston bushing, a gasket disposed between adjacent ends of such valve and piston bushings, and a gasket between the outer end of each of said bushings and the respective casing sections, said gasket being displaced upon securing the casing sections together for preventing leakage of fluid under pressure around the ends of said bushings.

4. In a fluid pressure brake, the combination with a brake pipe and a vent valve device operative to effect a sudden reduction in brake pipe pressure, said vent valve device comprising a casing divided into a valve section and a piston section each of which is provided with a chamber open at one end to the chamber in the other section, a vent valve disposed in the chamber in the valve section, a spring disposed in the chamber in the valve section and acting on said vent valve, and a member having a seat for said vent valve and disposed in the open end of the chamber in the valve section and having a loose lateral fit therein, means adapted to normally hold said member and thereby said valve and spring assembled in said valve section, said means being rendered ineffective upon turning said member, a piston disposed in the chamber in the piston section, said piston having a stem adapted to engage and move said vent valve from said seat, and an element disposed in the open end of the chamber in said piston section and having a loose lateral fit therein, means adapted to normally hold said element and thereby said piston assembled in said piston section and being rendered ineffective upon turning said element, and gasket means for preventing leakage of fluid under pressure around the ends of said member and element.

5. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, and a check valve disposed in said casing in said communication and having a seat on the reducing valve device side of the check valve.

6. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, an air strainer disposed in said communication within said casing, and a check valve disposed in said casing in said communication and having a seat on the reducing valve device side of the check valve.

7. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, an air strainer disposed in said communication within said casing, and a check valve disposed in said casing in said communication and having a seat on the reducing valve device side of the check valve, said casing and thereby said vent valve device, strainer and check valve being removable, as a unit, from said pedestal.

8. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, and a check valve disposed in said casing in said communication and having a seat on the reducing valve device side of the check valve, said casing being built in two separable sections for assembling said vent valve device in and for removing said vent valve device from said casing.

9. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, and a check valve disposed in said casing in said communication and having a seat on the reducing valve device side of the check valve, said casing being built in two separable sections for assembling said vent valve device in and for removing said vent valve device from said casing, one of said casing sections having a chamber in which said check valve is removably disposed.

10. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, an air strainer disposed in said communication within said casing, and a check valve disposed in said casing in said communication and having a seat on the reducing valve device side of the check valve, said casing being built in two separable sections for assembling said vent valve device and strainer in and for removing said vent valve device and strainer from said casing.

11. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, a check valve disposed in said casing in said communication and having a seat on the reducing valve device side of the check valve, said casing being built in two separable sections each of which has a chamber open at one end to a cooperating chamber in the other section, a portion of said vent valve device being disposed in one of said chambers, the remainder of said vent valve device being disposed in the other chamber in cooperating relation with the portion in the other chamber, and suitable gaskets arranged in said casing for rendering the various portions of said vent valve device effective when said sections are secured together.

12. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, and a check valve disposed in said casing in said communication and having a seat on the reducing valve device side of the check valve, said casing being built in two separable sections each of which has a chamber open at one end to a cooperating chamber in the other section, a portion of said vent valve device being disposed in one of said chambers, the remainder of said vent valve device being disposed in the other chamber in cooperating relation with the portion in the other chamber, the various portions of said vent valve device being readily applicable to and removable from the chambers in the casing sections by hand.

13. A pedestal brake valve device comprising, in combination, a pedestal, a brake valve device mounted on said pedestal, a brake pipe connected to said pedestal, a signal pipe connected to said pedestal, a reducing valve device mounted on said pedestal, said pedestal having a mounting face, a casing secured to said pedestal upon said mounting face, a brake pipe vent valve device disposed in said casing, said casing and pedestal having passageways registering at said mounting face, one of said passageways connecting said brake pipe to said vent valve device and another connecting said brake valve device to said vent valve device, and still another passageway establishing a communication from said reducing valve device to said signal pipe, a check valve disposed in said casing in said communication and having a seat on the reducing valve device side of the check valve, said casing being built in two separable sections each of which has a chamber open at one end to a cooperating chamber in the other section, a portion of said vent valve device being disposed in one of said chambers, the remainder of said vent valve device being disposed in the other chamber in cooperating relation with the portion in the other chamber, an air strainer disposed in a chamber formed in one of said casing sections, and suitable gaskets arranged in said casing for rendering the various portions of said vent valve device and said strainer effective when said sections are secured together.

ELLIS E. HEWITT.